United States Patent [19]

Makino et al.

[11] Patent Number: 5,533,813
[45] Date of Patent: Jul. 9, 1996

[54] DYNAMIC AIR PRESSURE BEARING

[75] Inventors: Hiroshi Makino; Teiji Sata, both of Ebina, Japan

[73] Assignee: Fuji Xerox Co., Ltd., Tokyo, Japan

[21] Appl. No.: 320,271

[22] Filed: Oct. 11, 1994

[30]  Foreign Application Priority Data

Feb. 28, 1994 [JP]  Japan .................................. 6-029989

[51] Int. Cl.⁶ .................................................. F16C 33/20
[52] U.S. Cl. ............................ 384/115; 384/292; 384/909
[58] Field of Search ..................................... 384/100, 112, 384/292, 115, 114, 909

[56]  References Cited

U.S. PATENT DOCUMENTS

| 4,797,009 | 1/1989 | Yamazaki ................................ | 384/100 |
| 5,127,744 | 7/1992 | White et al. ............................ | 384/112 |
| 5,129,739 | 7/1992 | Asai et al. ............................... | 384/292 |

FOREIGN PATENT DOCUMENTS 3-199714  8/1991  Japan .

Primary Examiner—Lenard A. Footland
Attorney, Agent, or Firm—Oliff & Berridge

[57]  ABSTRACT

Disclosed is the improvement in a dynamic air pressure bearing in which a rotor is supported at high speed in the non-contact state. In an optical deflector, a stationary shaft is planted at the center portion of a housing. A stator core is disposed on a stud. A magnet yoke is integrated with a sleeve rotated relative to the stationary shaft. The magnet yoke contains an inner magnet and an outer magnet. A rotary polygonal mirror is mounted on a flange fixed on the sleeve by means of a center screw and a mirror cap. The rotary polygonal mirror is rotated at high speed together with the sleeve relative to the stationary shaft, thus constituting a dynamic air pressure bearing between the shaft and the sleeve. The stationary shaft is constituted of a main body and a ring-like bearing member fitted in the main body. The bearing member is formed of a ceramic material and formed with grooves for generating dynamic air pressure. The sleeve is preferably constituted of a main body and a bearing member of ceramic.

6 Claims, 3 Drawing Sheets

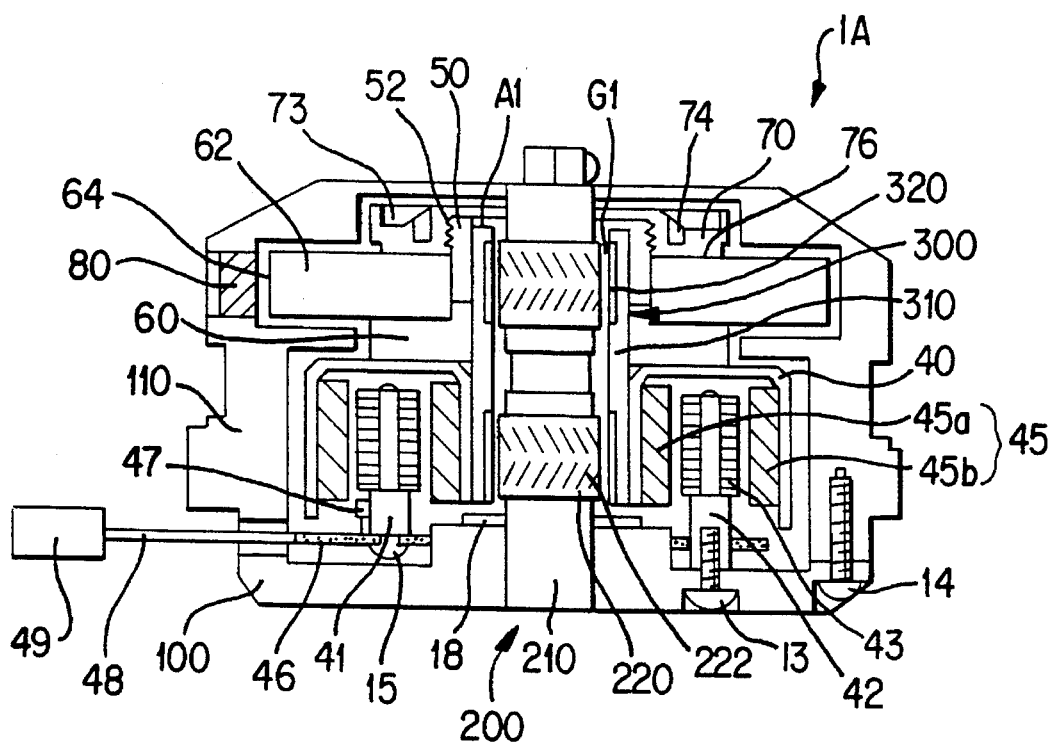
FIG. 1
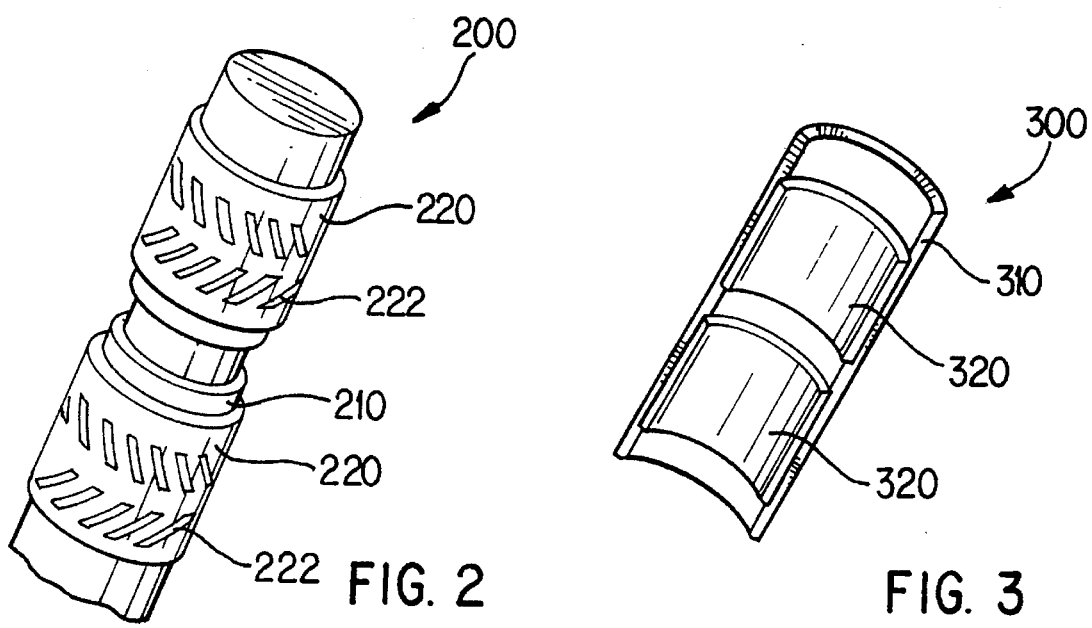
FIG. 2
FIG. 3

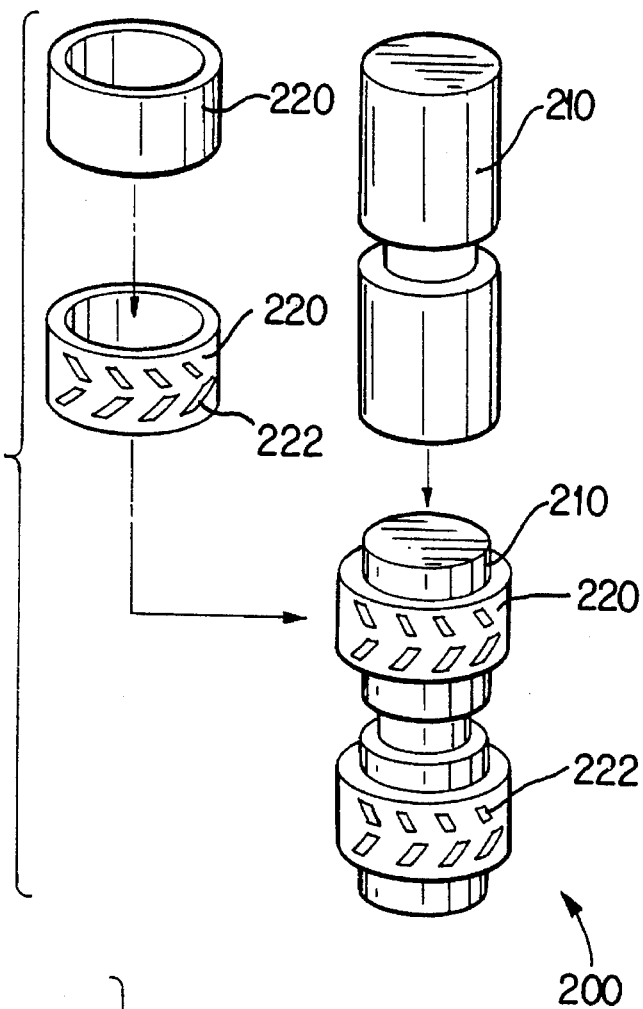
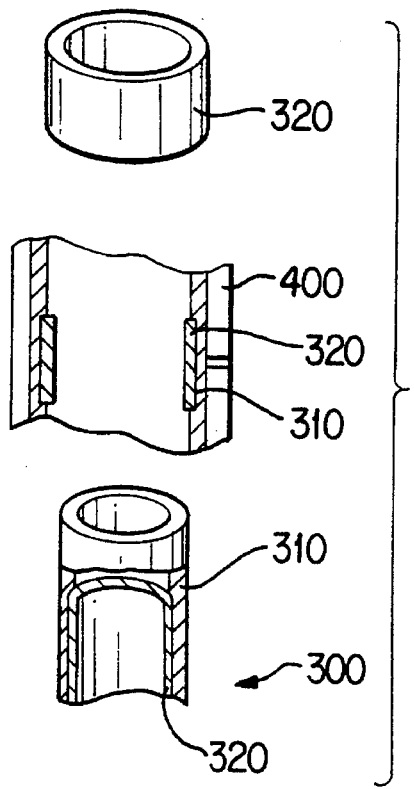

DYNAMIC AIR PRESSURE BEARING

BACKGROUND OF THE INVENTION

1. Field of the Invention

The present invention relates to a dynamic air pressure bearing in which grooves for generating air pressure are disposed on either of a rotor or a stator.

2. Description of the Related Art

In general, a dynamic air pressure bearing is used to stably rotate a rotor not in contact with a stator.

There is known a dynamic air pressure bearing having a rotating member composed of either of a sleeve and a shaft which are fitted to each other. In this case, the sleeve and shaft are formed of an iron-base material and are subjected to heat-treatment or surface treatment for enhancing the life of the bearing; or they are formed of a ceramic material.

FIG. 6 is a schematic view of explaining an optical deflector; and FIG. 7 is a perspective view of a shaft 20 and a sleeve 30 constituting a dynamic air pressure bearing.

Referring to FIG. 6, an optical deflector is generally designated by reference numeral 1. In this optical deflector 1, the shaft 20 is erected and fixed at the center portion of a housing 10 as a base, and a cover 12 is mounted outside the housing 10 by way of a housing adaptor 11.

A stator core fixing stud 42 is mounted on the housing 10 by means of a screw 13, and a stator core 43 is fixed on the stator core fixing stud 42. A circuit board fixing stud 41, which is supported by the stator core 43, supports a circuit board 46 by means of a screw 15. A motor drive control circuit and the like are mounted on the circuit board 46, and the circuit board 46 is connected to a voltage supply unit (not shown) by way of a harness 48 and a connector 49.

Grooves 22 for generating a dynamic air pressure are formed around the outer peripheral portion of the stationary shaft 20, and the sleeve 30 is rotatably disposed outside the stationary shaft 20 with a gap G1. A magnet yoke 40 is inserted around the outer peripheral side of the lower portion of the rotating sleeve 30. A magnet 45, which is composed of an inner magnet 45a and an outer magnet 45b surrounding the stator core 43, is mounted inside the magnet yoke 40.

A rotary polygonal mirror 62 is supported over the magnet yoke 40 by means of a mirror flange 60. Reflection mirror surfaces 64 are formed around the outer periphery of the rotary polygonal mirror 62. A center screw 50 is attached to the top of the rotating sleeve 30, and a mirror cap 70 is mounted using a screw portion 52 of the center screw 50. The mirror cap 70 is so constructed as to press the rotary polygonal mirror 60 by way of a rotary polygonal mirror pressing force adjusting member 76, and which is intended to prevent the generation of the strain of the rotary polygonal mirror.

In the mirror cap 70, an air sump A1 is formed between the upper end surface of the sleeve 30 and the upper end surface of the stationary shaft 20. Fine holes 72, a balance correcting groove 73, a mirror cap fastening groove 74 and the like are provided at suitable portions of the mirror cap 70.

A damper 18 is mounted at the position opposed to the lower end surface of the sleeve 30 over the housing 10 for receiving the sleeve 30 upon stoppage of a motor. A magnetic detecting element 47 is provided on the circuit board 46, and a lens 80 is provided on the cover 12.

The operation of the optical deflector will be described below.

The magnet 45 (inner magnet 45a, outer magnet 45b) constituting the so-called scanner motor portion for rotating the rotary polygonal mirror 62 is composed of a permanent magnet, which generates a magnetic attracting force with the opposed stator core 43. The attraction force acts such that the opposed positions of the magnet 45 and the stator core 43 are prevented from being shifted in the axial direction (thrust direction) of the stationary shaft 20 of the motor.

Assuming that the fixed side of the stationary shaft 20 is directed downward and the opening side thereof is directed upward, when the magnet 45 is moved upward, there emerges a downward attracting component in the magnetic attraction force, and thereby the magnet 45 is returned downward. When the magnet 45 is moved downward, there emerges an upward attracting component, and thereby the magnet 45 is returned upward. The magnet 45 and the stator core 43 are thus opposed to each other at the specified axial position by the magnetic attraction force. In other words, the magnet 45 and the stator core 43 constitutes a magnet thrust bearing.

The magnetic detecting element 47 may include a Hall element. This detects a leakage flux of the magnet 45, that is, detects the passing of either the N-pole or the S-pole during the rotation of the magnet 45. The detection signal of the magnetic detecting element 47 is supplied to a control circuit section (not shown) by way of a wiring printed on the rotating board 46. On the basis of the detection signal, the control circuit section determines the direction of a current flowing a magnetic coil wound around each portion of the stator core 43. As a result, there is generated a force in the direction of continuing the rotation according to the correlation with the magnet 45. The magnet pole of the inner magnet 45a is set to be the same as that of the outer magnet 45b opposed to the inner magnet 45a.

When the rotating sleeve 30 is rotated, there is generated an air layer with a high pressure around the stationary shaft 20 (at the bearing gap G1). The pressure allows the rotating sleeve 30 to be floated from the stationary shaft 20, thus constituting a dynamic air pressure bearing.

In the figure, the grooves 22 for generating dynamic pressure are provided around the outer peripheral portion of the stationary shaft 20; however, they may be provided around the inner wall of the rotating sleeve 30 instead.

The air layer of the above gap G1 acts to keep constant the rotational center of the rotor portion. For example, when the rotating sleeve 30 is shifted in the right in the figure, the gap G1 in the right is made larger and the pressure in this gap is made smaller than that in the previous state. On the other hand, the gap in the left is made smaller, so that the pressure in this gap is made larger than that in the previous state. As a large or small change in the pressure becomes the above state, the rotating sleeve 30 is pushed in the left, and finally returned to the original position.

The cover, which serves to prevent dust as described above, is fixed on the housing adaptor by a screw. The cover is formed of plastic for reducing the cost. Moreover, to reduce the cost, the cover is often not used.

An incident light beam such as a laser beam is reflected by the reflection mirror surface 64 of the rotary polygonal mirror 62, and is emitted to a medium to be scanned such as a photosensible drum.

When the light beam is made incident to the reflection surface 64 and the rotary polygonal mirror 62 is rotated, the reflected light beam is gradually changed in the direction, and is thus deflected.

When the rotation proceeds and the next reflection mirror surface emerges, a light beam is made incident to this reflection mirror surface. Even at the reflection mirror surface, the light beam is deflected in the same manner as in the previous reflection mirror surface. Accordingly, the reflected light beams scan in a specified angular range, and the scanning rate thereof is dependent on the rotating speed of the polygonal mirror 62.

The dynamic air pressure bearing is of a stationary shaft type in which the shaft 20 is fixed; however, there is known a rotating shaft type in which a sleeve is fixed to a housing and a rotating shaft is inserted therein.

In addition, the dynamic air pressure bearing of this type has been disclosed, for example in Unexamined Japanese Patent Publication No. HEI 3-199714.

The prior art described above, however, has the following disadvantage: namely, since the bearing is constituted of the sleeve and shaft made of an iron-base material, it is poor in wear resistance, thereby tending to generate the melt-down phenomenon that the sleeve and shaft seize each other and obstructed from being rotated during the rotation of a motor. Namely, the prior art bearing is lack of the reliability as the motor. Moreover, there is known a ceramic made bearing for enhancing the wear resistance; however, it is difficult to be processed because of the high hardness of the ceramic, resulting in the increased cost, which is inconvenient in terms of mass-production.

SUMMARY OF THE INVENTION

An object of the present invention is to solve the above-described problems of the prior art, and to provide a dynamic air pressure bearing with a high reliability at a low cost.

To achieve the above object, according to the present invention, there is provided a high reliability bearing at a low cost, wherein the bearing includes a bearing member which is formed of a ceramic based material or a material with an elastic modulus equal to or more than that of the ceramic based material, and a member for supporting the bearing member which is formed of an iron based material or a material having an elastic modulus equal to or less than that of the iron based material.

Namely, according to the present invention, in the bearing in which either of a sleeve and a shaft fitted to each other is taken as a rotating member and the other is taken as a stationary member, the shaft is constituted of a multi-layer shaft.

In place of the shaft, the sleeve may be constituted of a multi-layer sleeve.

Both the shaft and sleeve may be constituted of a multi-layer shaft and a multi-layer sleeve, respectively.

In the above bearing of the present invention, a plurality of the bearing members may be partially disposed along the axial direction of the shaft main body and/or the sleeve main body.

In the above bearing of the present invention, the shaft main body or sleeve main body is different in the material from the bearing member, and the bearing member is formed of a material having an elastic modulus higher than that of the shaft main body or sleeve main body.

Preferably, the shaft main body or sleeve main body is formed of a plastic material, and the bearing member is formed of a ceramic or metal material.

Moreover, preferably, the above shaft main body or sleeve main body is formed of a metal material, and the bearing member is formed of a ceramic material.

Additionally, the present invention may be applied not only to an optical deflector but also to other drive motors.

With this construction, it becomes to minimize a portion to be processed, of a member with a high elastic modulus such as ceramic, and hence to simplify the processing compared with a solid member with a high elastic modulus, resulting in the reduced manufacturing cost. Moreover, since the surface of a bearing is formed of a member with a high elastic modulus, it becomes possible to provide a bearing excellent in the reliability. Accordingly, there can be manufactured a motor with a high reliability at a low cost.

Additionally, with this construction, it becomes possible to provide an inexpensive and light rotor, and hence to manufacture a low consumption power motor.

BRIEF DESCRIPTION OF THE DRAWINGS

FIG. 1 is a sectional view for explaining a structure of one embodiment of an optical deflector using a dynamic air pressure bearing of the present invention;

FIG. 2 is an enlarged view of a shaft of the dynamic air pressure bearing of the present invention;

FIG. 3 is an enlarged view of a sleeve of the dynamic air pressure bearing of the present invention;

FIG. 4 is a view for explaining one embodiment of a method of manufacturing the shaft of the dynamic air pressure bearing of the present invention;

FIG. 5 is a view for explaining one embodiment of a method of manufacturing the sleeve of the dynamic air pressure bearing of the present invention;

DESCRIPTION OF THE PREFERRED EMBODIMENTS

Figure 6:
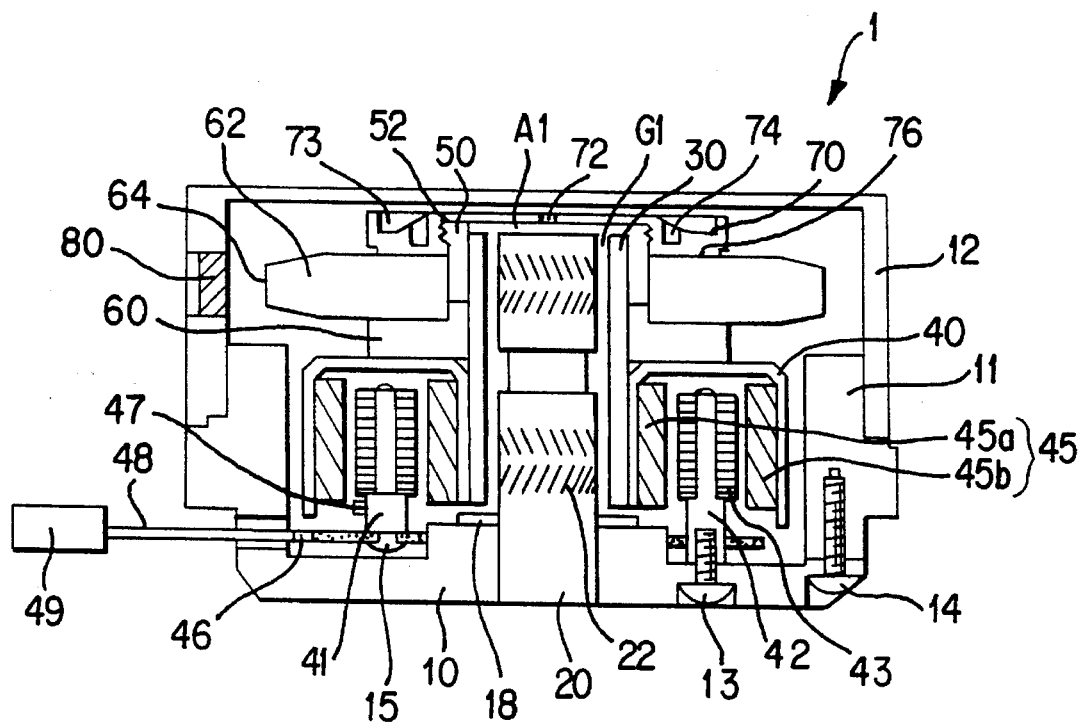
FIG. 6 is a view for explaining a conventional dynamic air pressure bearing.
Figure 7:
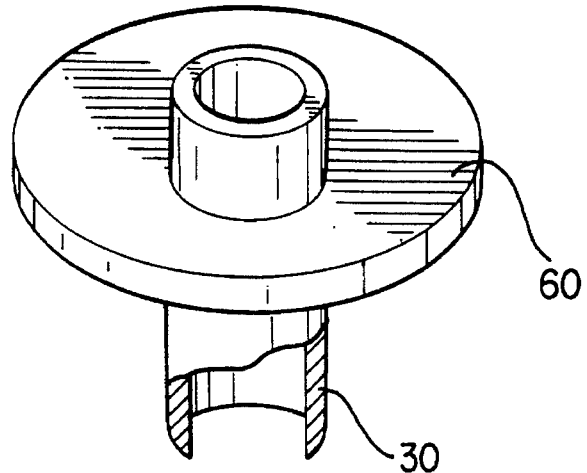
FIG. 7 is a sectional view for explaining a structure of one example of a conventional dynamic air pressure bearing.

Hereinafter, embodiments of the present invention will be described in detail with reference with the drawings.

FIG. 1 is a sectional view showing a structure of an optical deflector provided with a dynamic air pressure bearing of the present invention; FIG. 2 is a perspective view of a shaft constituting the dynamic air pressure bearing according to an embodiment of the present invention; and FIG. 3 is a view for explaining a structure of a bearing sleeve.

Referring to FIG. 1, an optical deflector is generally designated by the reference numeral 1A. In this optical deflector 1A, a shaft 200 is erected and fixed at the center portion of a housing 100 as a base, and a housing adaptor 110 is mounted outside the housing 100.

A stator core fixing stud 42 is mounted on the housing 100 by means of a screw 13, and a stator core 43 is fixed on the stator core fixing stud 42. A circuit board fixing stud 41, which is supported by the stator core 43, supports a circuit board 46 by means of a screw 15. A motor drive control circuit and the like are mounted on the circuit board 46, and the circuit board 46 is connected to a voltage supply unit (not shown) by way of a harness 48 and a connector 49.

The stationary shaft 200 has a bearing main body 210 at the center portion and a bearing member 220. Grooves 222 for generating dynamic air pressure are formed around the outer peripheral portion of the bearing member 220. A sleeve 300 is rotatably disposed outside the stationary shaft 200 with a gap G1. The sleeve 300 has a main body 310 and a bearing member 320 provided inside the main body 310. A magnet yoke 40 is inserted around the outer peripheral side of the lower portion of the rotating sleeve 300. A magnet 45, which is composed of an inner magnet 45a and an outer magnet 45b surrounding the stator core 43, is mounted inside the magnet yoke 40.

A rotary polygonal mirror 62 is supported over the magnet yoke 40 by means of a mirror flange 60. Reflection mirror surfaces 64 are provided around the outer periphery of the rotary polygonal mirror 62. A center screw 50 is mounted on the top of the rotating sleeve 300, and a mirror cap 70 is mounted using a screw portion 52 of the center screw 50.

The mirror cap 70 is so constructed as to press the rotary polygonal mirror 60 by way of a rotary polygonal mirror pressing force adjusting member 76, and which is intended to prevent the generation of the strain of the polygonal mirror.

In the mirror cap 70, an air sump A1 is formed between the upper end surface of the sleeve 300 and the upper end surface of the stationary shaft 200. Fine holes, a balance correcting groove 73, a mirror cap fastening groove 74 and the like are provided at suitable portions of the mirror cap 70.

A damper 18 is provided at the position opposed to the lower end surface of the sleeve 300 over the housing 100 for preventing the sleeve 300 from being directly touched to the housing in the midway of transportation of a motor or the like. A magnetic detecting element 47 is mounted on the board 46, and a lens 80 is mounted on the housing adaptor 110.

A rotor portion constituting a scan motor is defined as a portion insertedly provided around the stationary shaft 200 with a gap G1, which includes the rotating sleeve 300; the magnet yoke 40 press-fitted or adhesively bonded in the rotating sleeve 300; the magnets 45a and 45b fixed on the magnet yoke 40; the polygonal mirror 62 fixed on the mirror flange 60 provided around the outer peripheral portion of the rotary sleeve 300; the mirror cap 70; and the rotary polygonal mirror pressing force adjusting member 76.

The mounting of the rotary polygonal mirror 62 is made by the steps of inserting the center hole of the rotary polygonal mirror 62 around the center screw 50 fixed on the stationary sleeve 300; disposing the rotary polygonal mirror pressing force adjusting member 76 from the upper side thereof; coating the center screw 20 and the mirror cap 70 with a rotary polygonal mirror fixing member; attaching the mirror cap 70 to the mirror flange 60; and fixing it to the mirror flange 60 by means of the center screw 50. In addition, there is no throughhole except for the center opening of the rotary polygonal mirror.

An air sump A1 for suppressing the damping in the thrust direction (axial direction) is formed between the upper end of the stationary shaft 200 and the mirror cap 70. In addition, the fine holes provided at suitable positions communicate the air sump A1 to the atmospheric air for stabilize the damping effect due to the above air sump A1. Moreover, the damp 18 is intended to prevent the rotor portion from being directly contacted with the housing 100 when the rotor portion is stopped.

On the other hand, the stator portion constituting a scanner motor includes the housing 100; the housing adaptor 110 fixed on the housing 100 by means of the screw 14; the stationary shaft 200 fixed on the housing 110 at its end by press-fitting or the like; the stator core 43 wounded with an electromagnetic coil, preferably, in the toroidal form and fixed on the housing 100 by means of the screw 13 through the stud 42; the board 46 supported by the stud 41 mounted on the stator core 43; and the magnetic detecting element (sensor) 47, which is preferably formed of a Hall element, planted on the rotary board 46.

The magnet 45 (inner magnet 45a, outer magnet 45b) constituting the so-called scanner motor portion for rotating the rotary polygonal mirror 62 is constituted of a permanent magnet. As is shown in FIG. 1, annular magnets each having four magnetized poles are disposed around the outer and inner peripheries of the stator core 43 for generating a magnetic attracting force with the opposed stator core 43.

This attracting force acts such that the opposed positions of the magnets 45a and 45b against the stator core 43 are prevented from being shifted in the axial direction (thrust direction) of the motor. Assuming that the fixed side of the stationary shaft 200 is directed downward and the other opening side thereof is directed upward, when the magnet 45 is moved upward, there emerges a downward attracting component in the attracting force, and thereby the magnet 45 is returned downward. When the magnet 45 is moved downward, there emerges an upward attracting component, and thereby the magnet 45 is returned upward. The magnet 45 and the stator core 43 are opposed to each other at the specified axial positions by the magnetic attracting force. In other words, the magnet 45 and the stator core 42 constitute a magnetic thrust bearing.

The magnetic detecting element 47 may include a Hall element. This detects a leakage flux of the magnet 45, that is, detects the passing of either the N-pole or the S-pole during the rotation of the magnet. The detection signal of the magnetic detecting element 47 is supplied to a control circuit section (not shown) by way of a wiring printed on the rotating board 46. On the basis of the detection signal, the control circuit section determines the direction of a current flowing a magnetic coil wound around each portion of the stator core 43. As a result, there is generated a force in the direction of continuing the rotation according to the correlation with the magnet 45. The magnet pole of the inner magnet 45a is set to be the same as that of the outer magnet 45b opposed to the inner magnet 45a.

FIG. 2 shows the detail structure of the stationary shaft 200. The stationary shaft 200 includes the main body 210 at the center portion and the bearing member 220 provided around the outer peripheral portion of the main body 210. The outer peripheral surface of the bearing member 220 has a size larger than that of the main body 210, and is formed with the grooves 222 for generating dynamic air pressure.

The shaft main body 210 is formed of an inexpensive material such as a plastic material, and the bearing member 220 is formed of a material with a high wear resistance and a high reliability such as ceramic. By separately providing the shaft main body and the bearing member, it becomes possible to reduce the amount of ceramic which is expensive but has excellent characteristics as the bearing member, and hence to reduce the total manufacturing cost of the stationary shaft 200.

By suitably selecting the number of the bearing members 220 and the mounting position thereof to the shaft main body, it becomes possible to enhance the degree of freedom in design.

FIG. 3 is a view for explaining the structure of the sleeve 300.

The sleeve constituting the dynamic air pressure bearing of the present invention may be of a single pipe structure like the conventional sleeve; however, it may be of a structure in which a separate bearing member 320 is provided inside the sleeve main body 310.

By forming the sleeve main body 310 of a plastic material and disposing a ceramic made bearing member 320 inside the sleeve main body 310, it becomes possible to obtain an inexpensive sleeve.

When the rotating sleeve 300 is rotated, a high pressure air layer is generated around the stationary shaft 200 (at the bearing gap G1) by the grooves 222 for generating dynamic pressure. The pressure allows the rotating sleeve 300 to be floated from the stationary shaft 200, thus constituting a dynamic air pressure bearing.

In the figure, the grooves 222 for generating dynamic pressure are provided around the outer peripheral portion of the rotating shaft 200; however, they may be formed around the inner wall of the bearing member 320 of the rotating sleeve 300.

The air layer of the above gap G1 acts to keep constant the rotational center of the rotor portion. For example, when the rotating sleeve 300 is shifted in the right of the figure, the gap G1 in the right is made larger, and the pressure in this gap is made smaller. On the other hand, the gap in the left is made smaller, so that the pressure in this gap is made larger. As a small or large change in pressure becomes the above state, the rotating sleeve 300 is pushed in the left and finally returned to the original position.

The cover portion over the housing adaptor 110 acts to make steady the flow of air around the rotor when the rotor is rotated for suppressing the generation of wind loss, and to suppress wind cutting sounds during the rotation of the motor.

In such a construction, since the cover portion is integrated with the housing adaptor, the inner shape of the cover portion can be formed to correspond to the outer shape of the rotor. As a result, it becomes possible to reduce the influence of the wind pressure and the vibration during the rotation of the motor.

However, as described above, when the rotor is started to be rotated, the shaft is first rotated while being contacted with the sleeve. As the rotational speed is increased to some extent, the pressure of air between the shaft and the sleeve is increased. Thus, the sleeve is finally rotated not in contact with the shaft. In the case where the rotor is stopped, the pressure of air between the shaft and the sleeve is gradually lowered. Thus, the shaft comes in contact with the sleeve as the rotational speed is decreased to some extent, and it finally stopped. In this way, upon stating of rotation and stoppage of rotation, the shaft comes in contact with the sleeve, and accordingly, the shaft and the sleeve tend to be worn.

To reduce the above wear to the utmost, the members are required to be formed of ceramic and the like as described above. In this embodiment, the portion using the ceramic is limited to the dynamic pressure generating groove portion of the bearing, thereby simplifying the processing of the member. This makes it possible to manufacture an inexpensive bearing while keeping the high reliability.

FIG. 4 is a view for explaining one embodiment of a method of manufacturing the stationary shaft.

First, the shaft main body 210 is formed of a plastic material by a processing means such as a molding method. On the other hand, there is prepared the bearing member 220 formed of a ring-like ceramic material and having the grooves 222 for generating dynamic pressure around the outer peripheral surface. The bearing member 220 is fixed around the outer peripheral portion of the shaft main body 210 at a specified position. As the fixing means, there is used an adhesive or a press-fitting means.

The outer peripheral surface of the bearing member 220 may be ground relative to the center of the shaft main body 210 as needed, so that the coaxial accuracy of the stationary shaft 200 can be improved.

FIG. 5 is a view for explaining one embodiment of a method of manufacturing the rotating sleeve.

First, there is prepared a ring-like bearing member 320 made of ceramic. The bearing member 320 is set in a molding die 400, and plastic is molded around the outer peripheral portion of the bearing member 320 for molding the sleeve main body 310, thus manufacturing the rotating sleeve 300.

The inner peripheral surface of the bearing member 320 may be ground relative to the sleeve main body 310 as needed, so that the coaxial accuracy of the rotating sleeve 300 can be improved.

As described above, in a dynamic air pressure bearing of the present invention, at least either of the shaft and a sleeve relatively rotated is composed of a main body member and a bearing member, and the bearing member is formed of a material with a high elastic modulus compared with that of the main body member. The bearing member is formed of, for example ceramic, and the main body member is formed of plastic. With this construction, the amount of ceramic which is expensive but has a high performance as the bearing member can be reduced, thus obtaining an inexpensive dynamic air pressure bearing.

In addition, the present invention is not limited to the structure that grooves for generating air pressure are formed on the shaft of the bearing, and may be applied to the structure that the above grooves are provided on the sleeve side.

The present invention is also applied to a drive motor other than the optical deflector, and further to the application in which a rotor is rotated not in contact with a stator.

What is claimed is:

1. A dynamic air pressure bearing comprising:

a shaft having a shaft main body and bearing member laminated around an outer peripheral portion of said shaft main body, said shaft main body being formed of a plastic material, and said bearing member being formed from one of a ceramic material and a metal material and having an elastic modulus higher than that of said shaft main body; and a sleeve fitted around an outer peripheral side of said shaft with a gap such that said sleeve is spaced from said shaft and rotated relative to said shaft;

wherein at least one of said shaft and said sleeve includes grooves for generating dynamic air pressure.

2. A dynamic air pressure bearing according to claim 1, wherein a plurality of said bearing members are partially disposed along the axial direction of said shaft main body.

3. A dynamic air pressure bearing comprising:

a shaft; and a sleeve having a sleeve main body and bearing member laminated around an inner peripheral portion of said sleeve main body, said sleeve main body being formed of a plastic material, said bearing member being formed from one of a ceramic material and a metal material and having an elastic modulus higher than that of said sleeve main body, said sleeve being fitted around an outer peripheral side of said shaft with a gap such that said sleeve is spaced from said shaft and rotated relative to said shaft;

wherein at least one of said shaft and said sleeve includes grooves for generating dynamic air pressure.

4. A dynamic air pressure bearing according to claim 3, wherein a plurality of said bearing members are partially disposed along the axial direction of said sleeve main body.

5. A dynamic air pressure bearing comprising:

a shaft having a shaft main body and bearing member laminated around an outer peripheral portion of said shaft main body, said shaft main body being formed of a plastic material, said bearing member being formed of one of a ceramic material and a metal material and having an elastic modulus higher than that of said shaft main body; and a sleeve having a sleeve main body and bearing member laminated around an inner peripheral portion of said sleeve main body, said sleeve main body being formed of a plastic material, said bearing member being formed of one of a ceramic material and a metal material and having an elastic modulus higher than that of said sleeve main body, said sleeve being fitted around an outer peripheral side of said shaft with a gap such that said sleeve is spaced from said shaft and rotated relative to said shaft;

wherein at least one of said shaft and said sleeve includes grooves for generating dynamic air pressure.

6. A dynamic air pressure bearing according to claim 5, herein a plurality of said bearing members are partially disposed along the axial direction of said shaft main body, and a plurality of said bearing members are partially disposed along the axial direction of said sleeve main body.

* * * * *